Jan. 12, 1932.  J. F. DAHL  1,841,093
CALL DISTRIBUTING SYSTEM
Filed March 18, 1931   11 Sheets-Sheet 1

INVENTOR
J.F.DAHL
BY P. C. Smith
ATTORNEY

Jan. 12, 1932. J. F. DAHL 1,841,093
CALL DISTRIBUTING SYSTEM
Filed March 18, 1931 11 Sheets-Sheet 2

INVENTOR
J. F. DAHL
BY P. C. Smith
ATTORNEY

Jan. 12, 1932. J. F. DAHL 1,841,093
CALL DISTRIBUTING SYSTEM
Filed March 18, 1931 11 Sheets-Sheet 7

INVENTOR
J. F. DAHL
BY P. C. Smith
ATTORNEY

Patented Jan. 12, 1932

1,841,093

UNITED STATES PATENT OFFICE

JACK F. DAHL, OF WEST ORANGE, NEW JERSEY, ASSIGNOR TO BELL TELEPHONE LABORATORIES, INCORPORATED, OF NEW YORK, N. Y., A CORPORATION OF NEW YORK

CALL DISTRIBUTING SYSTEM

Application filed March 18, 1931. Serial No. 523,386.

This invention relates to call distributing telephone systems and has for its object to increase the efficiency with which large numbers of calls may be handled.

In the case of certain business houses such as department stores, etc. a large number of incoming calls are orders, in which case the calling party is not interested in the identity of the clerk who serves him, but merely in getting rapid and efficient service. To this end a large force of order clerks may be trained and by a system of call distribution the incoming calls may be handled with the minimum of delay. Such an order receiving system would be separate from the regular private branch exchange by means of which a calling party could reach a particular clerk or executive and would receive a distinct listing in the telephone directory. However, a person calling the store might not note the limitation on the order receiving number and might call the order operator when he really wanted the private branch exchange, or after calling the order desk it might be necessary to consult a sales person before the order clerk could enter the order properly.

The present invention is an improvement in a call distributing arrangement wherein the calls are stored and are then directed to the operator's or attendant's equipment in the order stored in response to ringing current applied to the incoming trunk. However, in order that a large number of attendants be available without causing the switches of incoming trunks to hunt over an excessive number of terminals, each trunk terminates in parallel in a plurality of switches, each switch having access to a different group of attendants' positions and means is provided to determine which of the switches shall hunt and therefore which group of positions shall be available to a particular call. A jack and lamp individual to each of the incoming trunks appear on the board of the private branch exchange belonging to the same subscriber but are normally ineffective. If a call is to be transferred to a person reached from the P. B. X. board or if it is necessary to consult such a person, the attendant is provided with a key-controlled potentiometer arrangement by which the lamp is lighted at the private branch exchange. When the branch exchange operator connects a cord circuit with this jack, the jack is automatically connected with the trunk and the transfer or consultation may take place. In addition, the attendant's position is equipped with keys for initiating the release of the connection or for signaling the main exchange which control a pair of relays in the talking conductors of the trunk without opening the talking conductors.

The call distributing arrangement is essentially the same as that disclosed and claimed in Patent No. 1,816,634, granted to W. W. Carpenter et al., July 28, 1931.

The invention will be more clearly understood from a consideration of the following description in connection with the accompanying drawings in which:

Fig. 12 shows the manner in which the remaining figures should be arranged.

Figure 1:
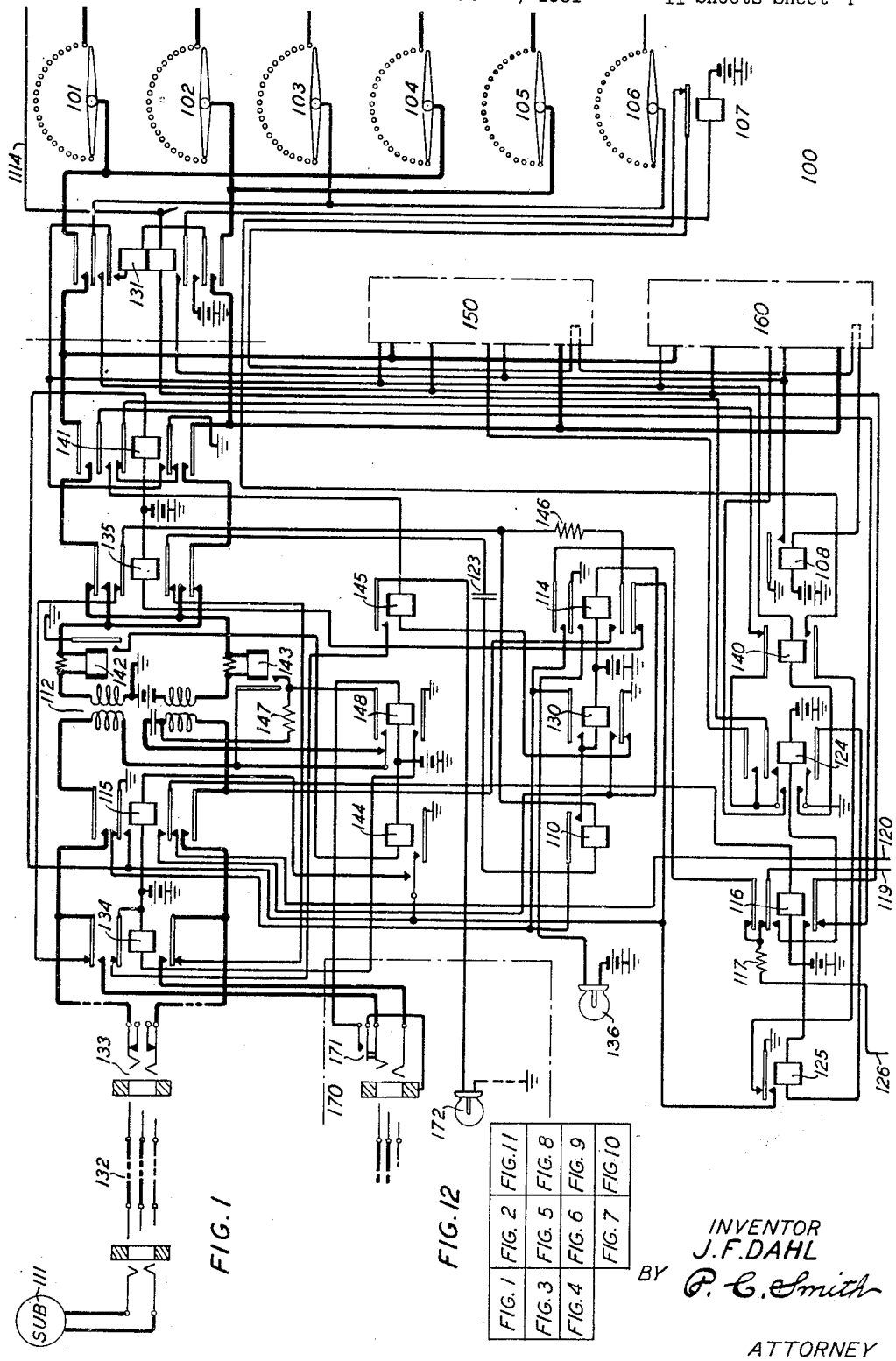
Fig. 1 shows a trunk circuit incoming to the order turret.
Figure 11:
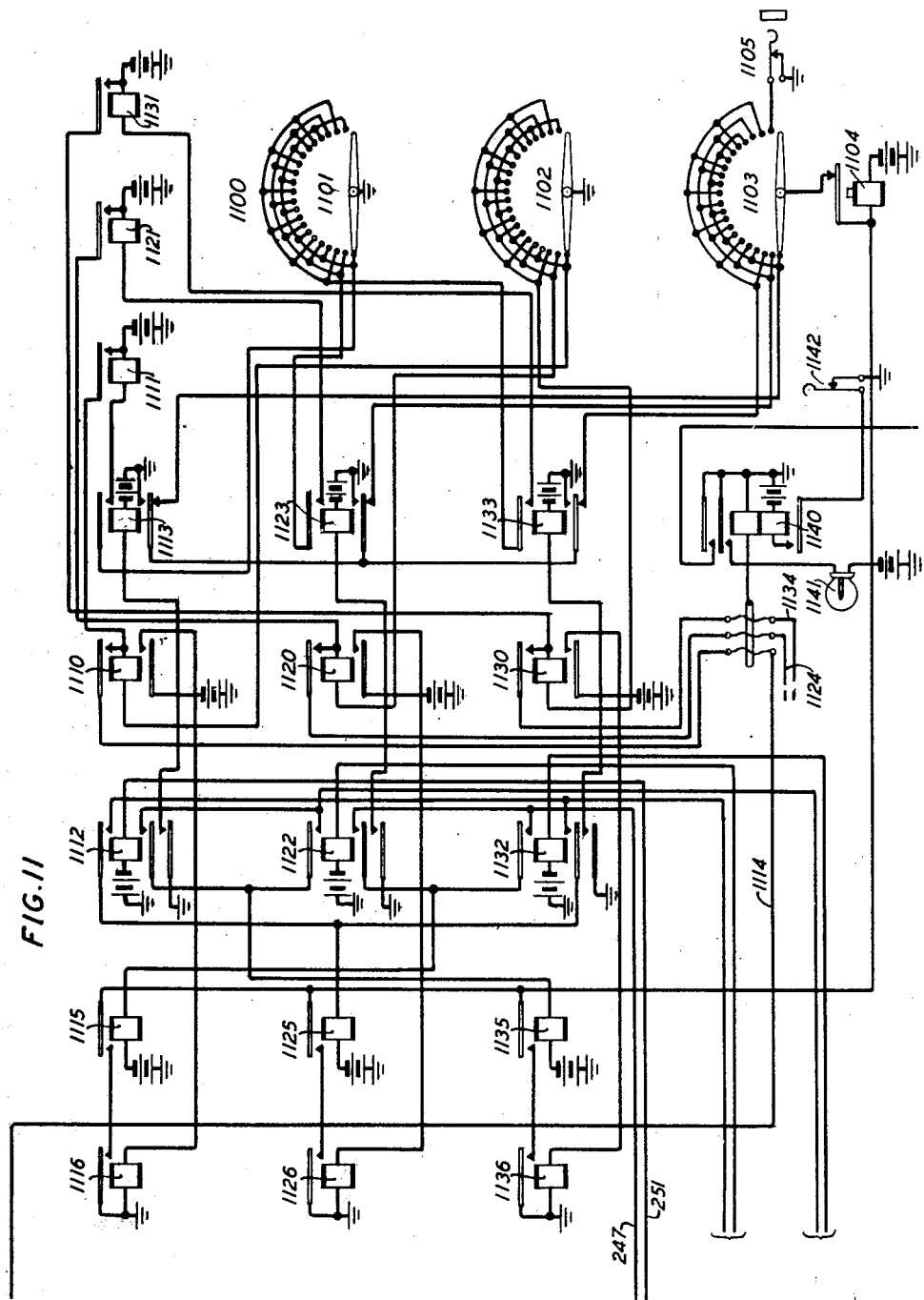
Fig. 11 shows the distribution control circuit.

The trunk circuit of Fig. 1 is one of a large number of trunks connecting the subscriber's order desk with the telephone exchange. They may appear in the terminal bank of final selectors at panel type offices or in the subscriber's multiple at manual offices as indicated. The operation of the equipment of the order turret is initiated by the application of ringing current to the trunk. Each trunk is equipped with three twenty-two position rotary switches, switches 100, 150 and 160, of which switch 100 alone is shown in full. The distribution control circuit of Fig. 11 determines which selector shall be employed in hunting for an idle operator. Since only three conductors are employed in the connection between the trunk and the order desk, the tip, ring and test conductors have been connected in multiple to two brushes in each case. Therefore, each trunk may have access to as many as one hundred thirty-two operators' positions. Associated with each trunk is a lamp 172 and jack 170, located at the subscriber's private branch exchange, which is distinct from and has a different designation than the order turret.

The allotter circuit shown in Figs. 3 to 7 serves to direct incoming calls to storing circuits one at a time in a predetermined order. To insure continuity of service the allotter has been divided into two sections each of which normally serves half of the incoming trunks, but is capable of serving all and which may be referred to simply as the A allotter and the B allotter. Switches 500 and 600 have access in multiple to the storing circuits and normally stand in engagement with corresponding sets of terminals so that the same storing circuit is preallotted by both allotters. Relays 301 to 306 and 401 to 406 are group relays, each one common to a group of trunks. Each group of trunks may contain as many as eleven trunks, but if less than the entire number of trunks is to be equipped the trunks will be distributed over the groups and each group will contain less than the maximum number of trunks. Whenever a call is received on a trunk in one of the groups the corresponding group relay is operated. Relays 521 to 526 are cut-in relays and operate in response to the operation of the coresponding group relay to give an indication to the storing circuit of the group within which the call originated. Relays 531 to 536 are lock-out relays and are used to prevent the handling of a second call in a particular group of trunks while a call is waiting in other groups. Relays 621 and 626 and 631 to 636 perform similar functions for the B allotter. The timing circuit of Fig. 7 serves to advance the switches 500 and 600 provided they are not advanced by the storing circuit within a predetermined length of time. It also operates an alarm if the advancing mechanism fails.

Figure 8:
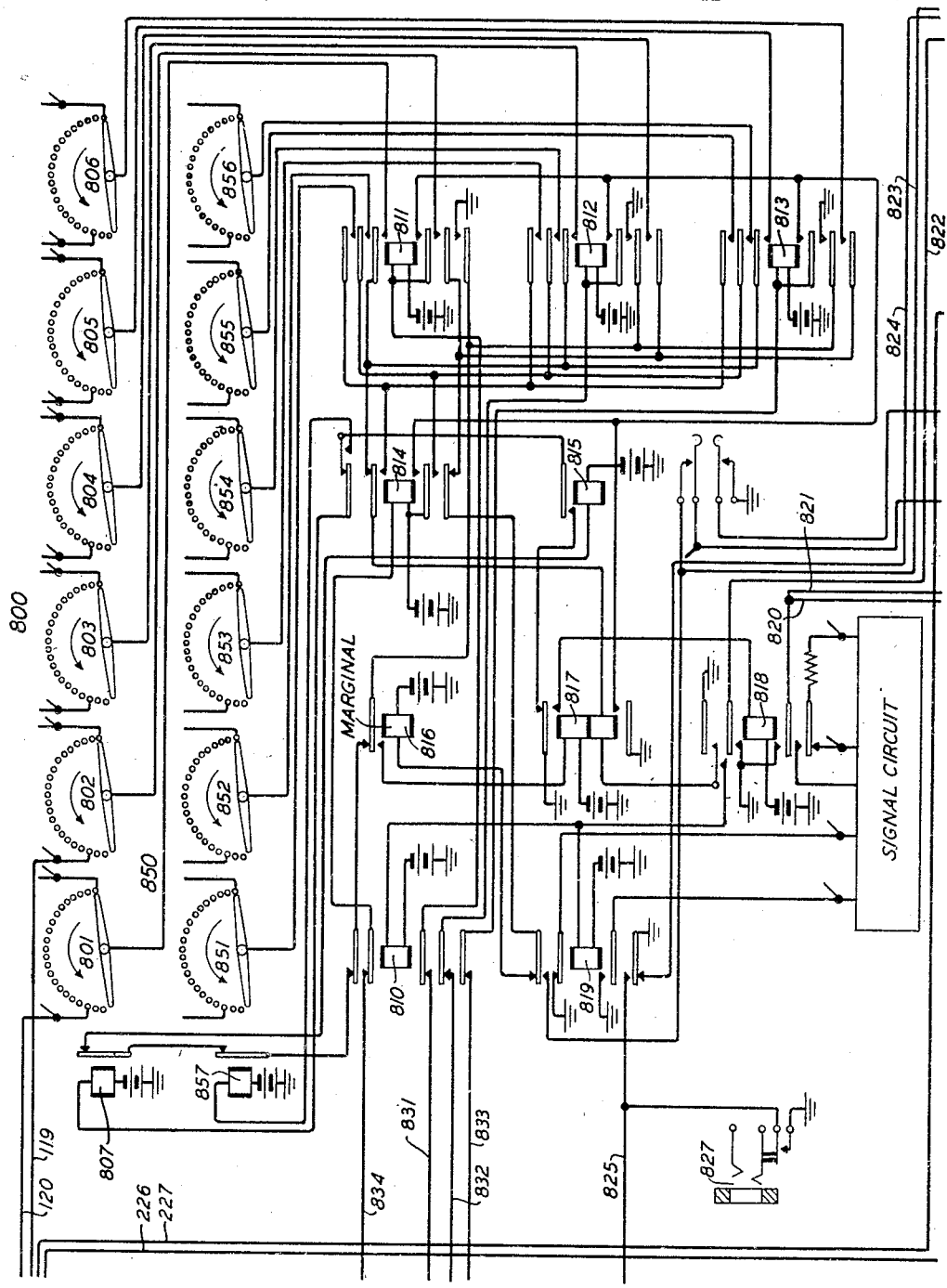
Fig. 8 shows one call storing circuit.

Fig. 8 represents one of twenty storing circuits by means of which calls incoming in rapid succession may be received and stored, and subsequently directed to the attention of an operator in the order in which they were stored. Two twenty-two position switches are employed to reach the one hundred thirty-two trunks since only two conductors interconnect the trunk and the storing circuit, whereby the twelve brushes may be arranged in six groups of two brushes each, each having access to twenty-two trunks. Relays 811, 812 and 813 in combination with relay 814 serve to identify the particular switch and brush set having access to the group of trunks within which the calling trunk lies. A group of twenty-two trunks to which a pair of brushes has access includes a corresponding group of eleven trunks from each allotter.

Figure 9:
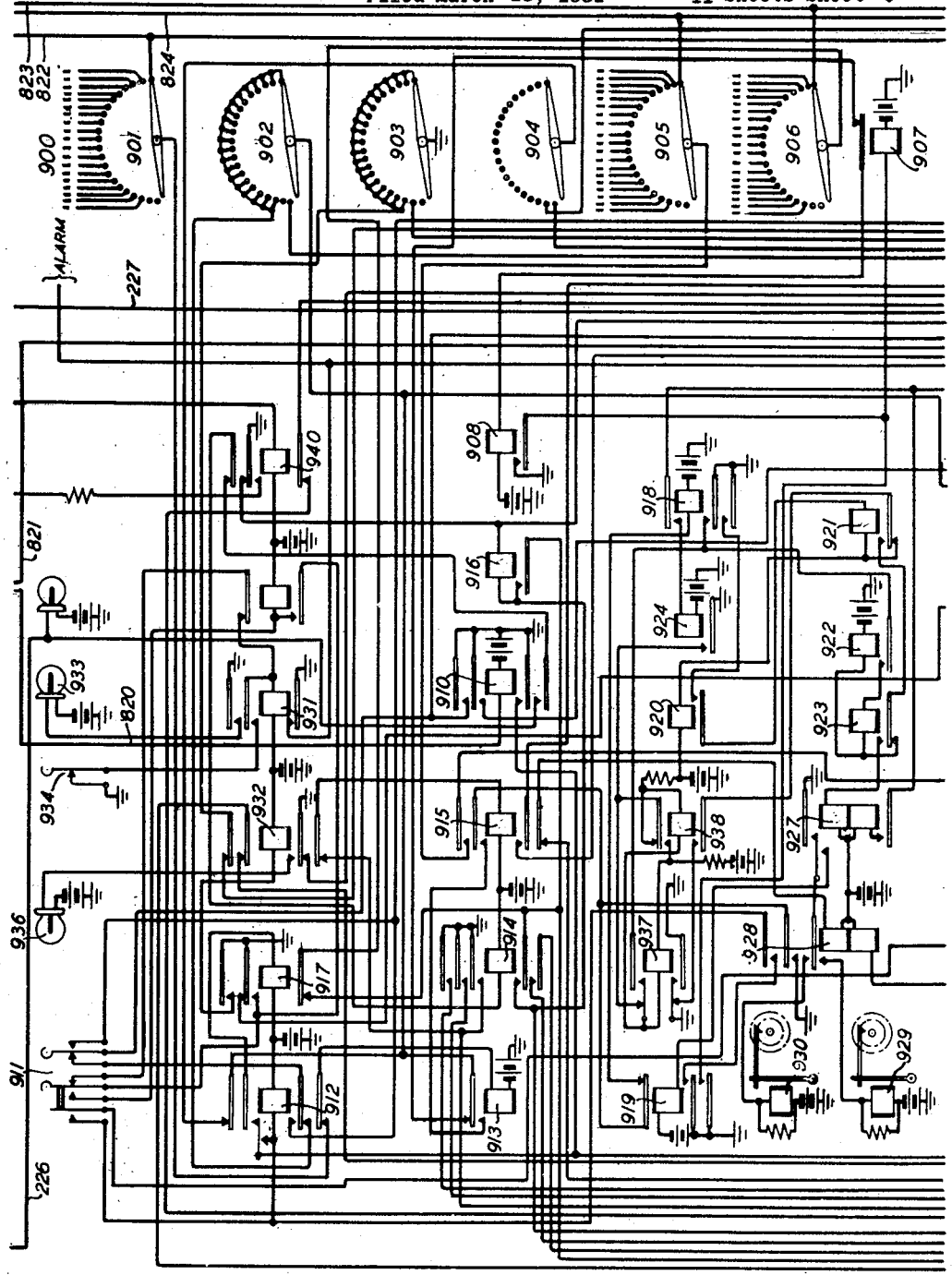
Figs. 9 and 10 show the start circuit.
Figure 10:
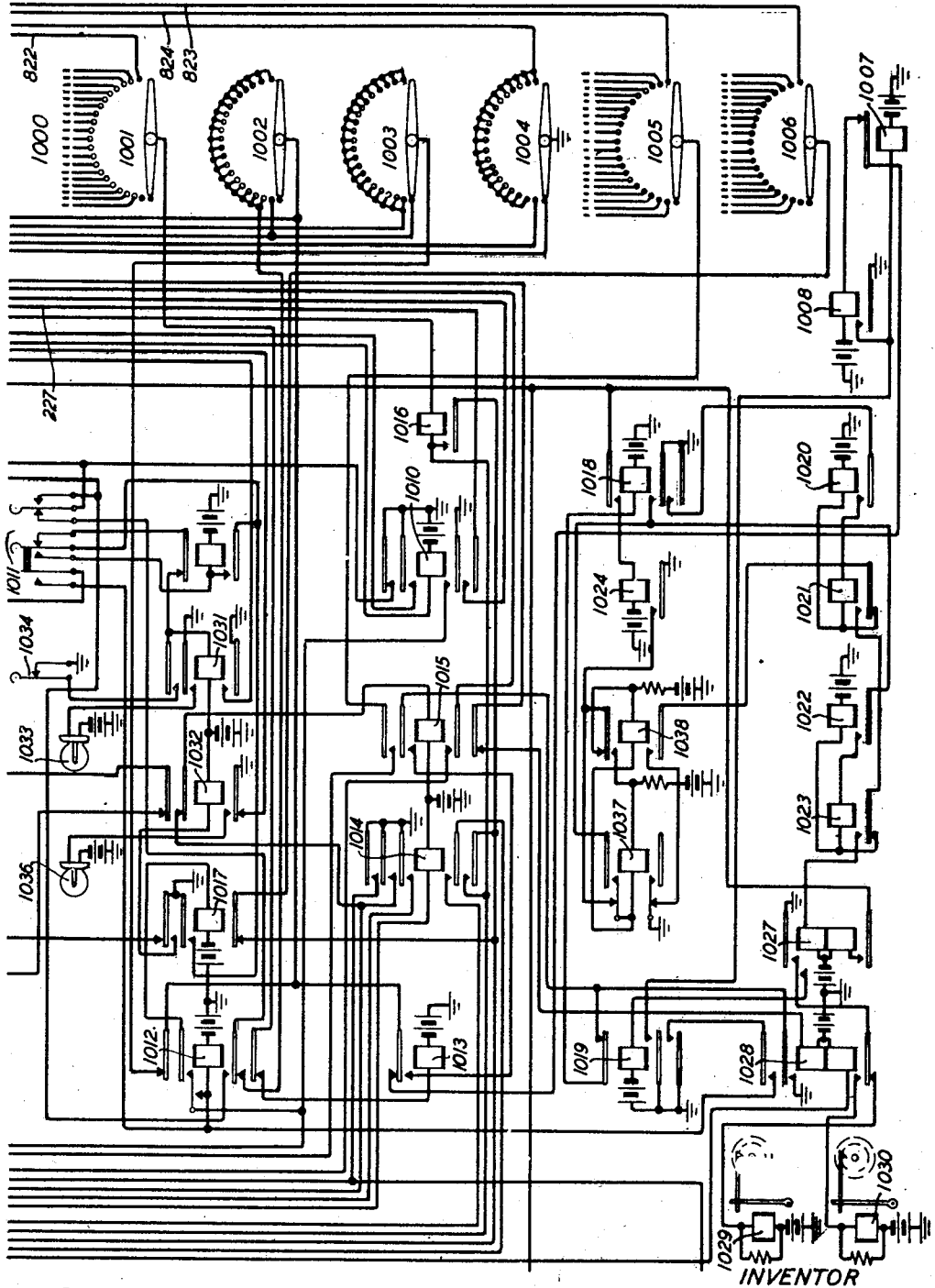

The start circuit of Figs. 9 and 10 is also a duplicate arrangement for the purpose of insuring continuous service. However, in this case the switches 900 and 1000 instead of operating simultaneously operate alternately, the arrival of one switch at its twenty-first position serving to advance the other switch to its first position and the switches remaining on their twenty-second terminals when not in use. As in the case of the allotter circuit, a plurality of timing relays are provided which serve to transfer all calls to one half of the start circuit when the other half fails for any reason. Each of the switches 900 and 1000 has access to the twenty storing circuits in the same order, and in the same order as the switches of the allotter. The allotter advances following the allotment of a call and may get well in advance of the start circuit, since the start circuit can only advance when one or more order desks are free. However, since the allotter and start circuit advance over the storing circuits in the same order, the stored calls are directed to idle operators in the same order as that in which they were stored.

Figure 2:
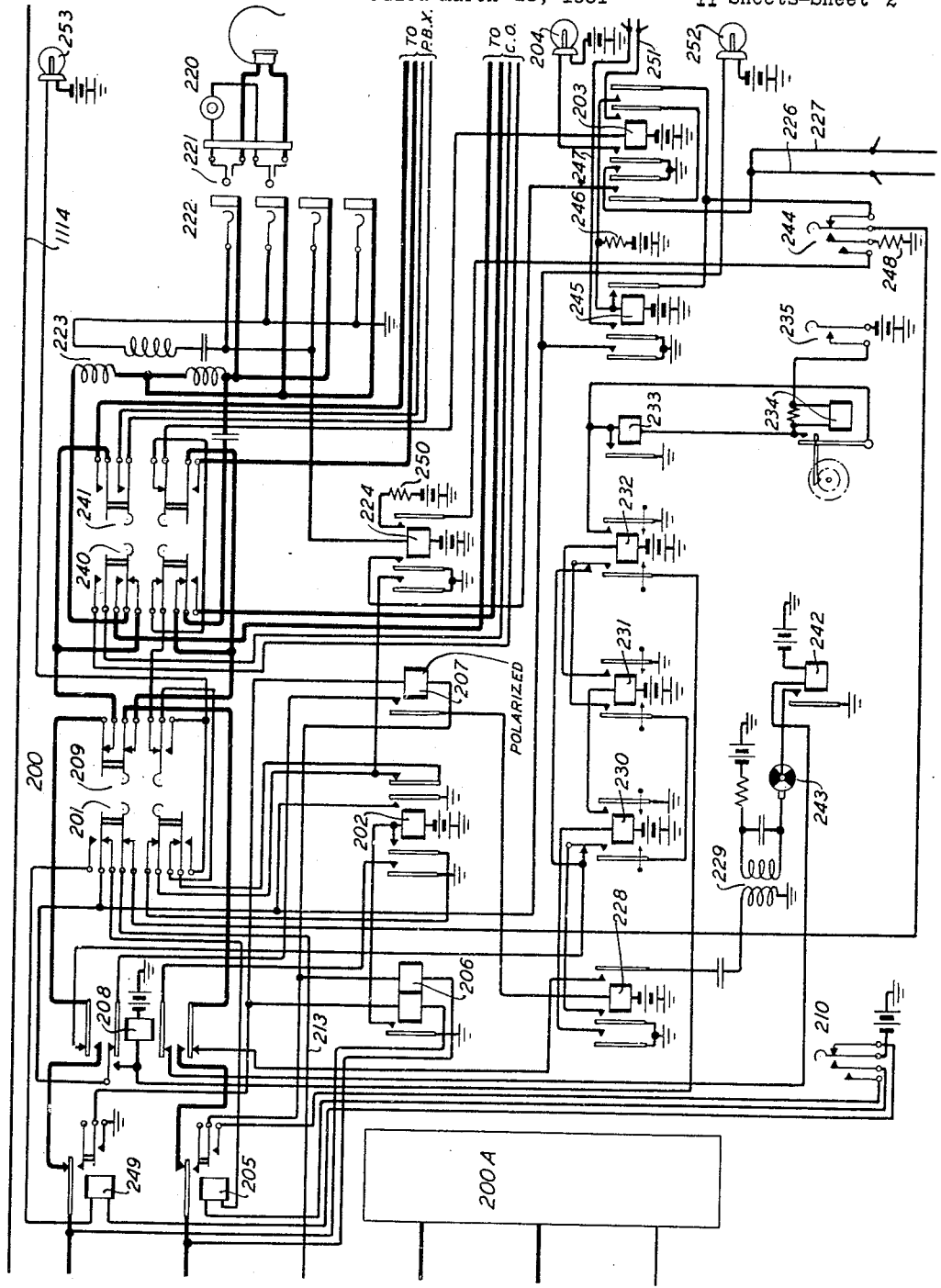
Fig. 2 shows the receiving circuit at the order operator's desk.
Figure 3:
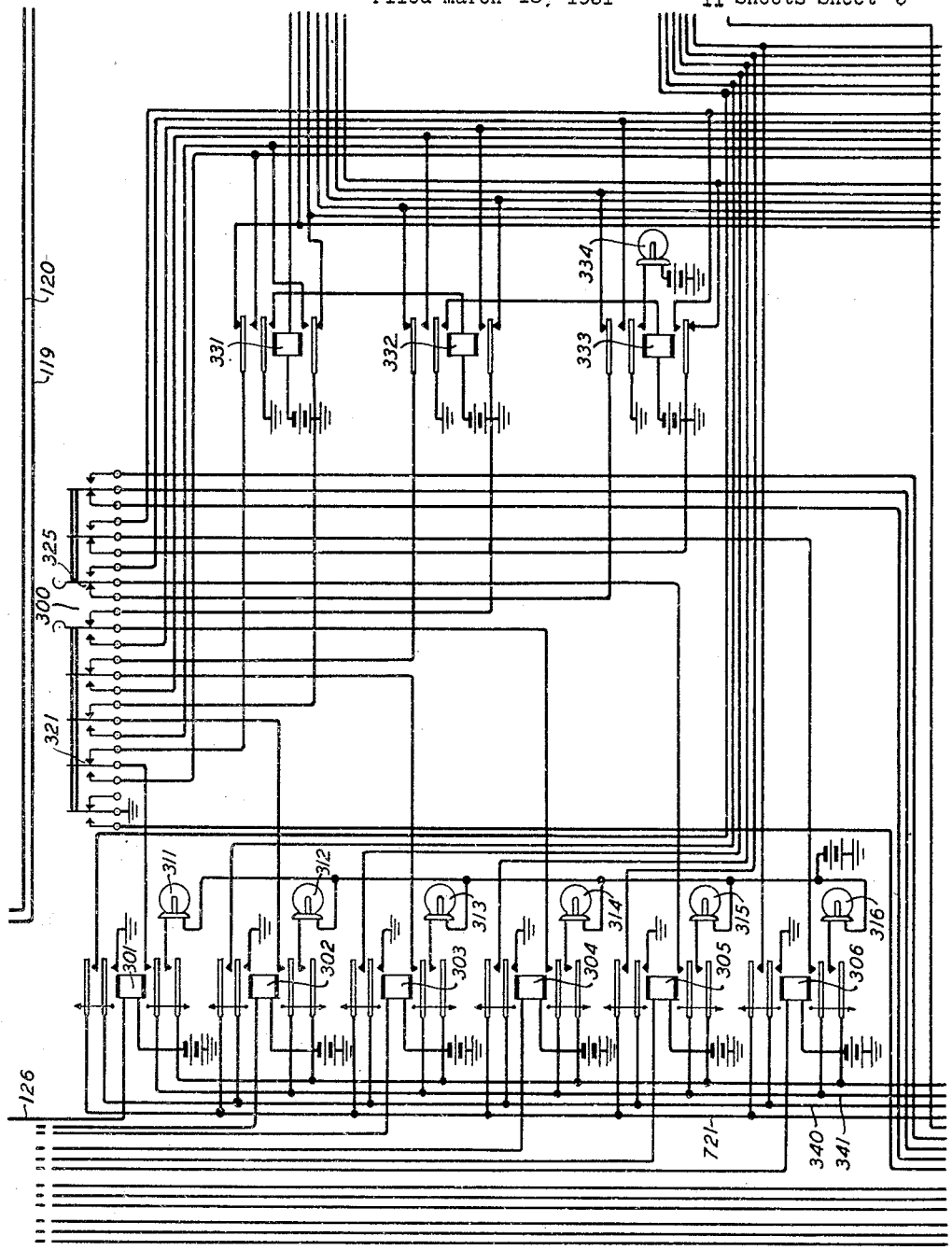
Figs. 3 to 7 show the allotter circuit.
Figure 4:
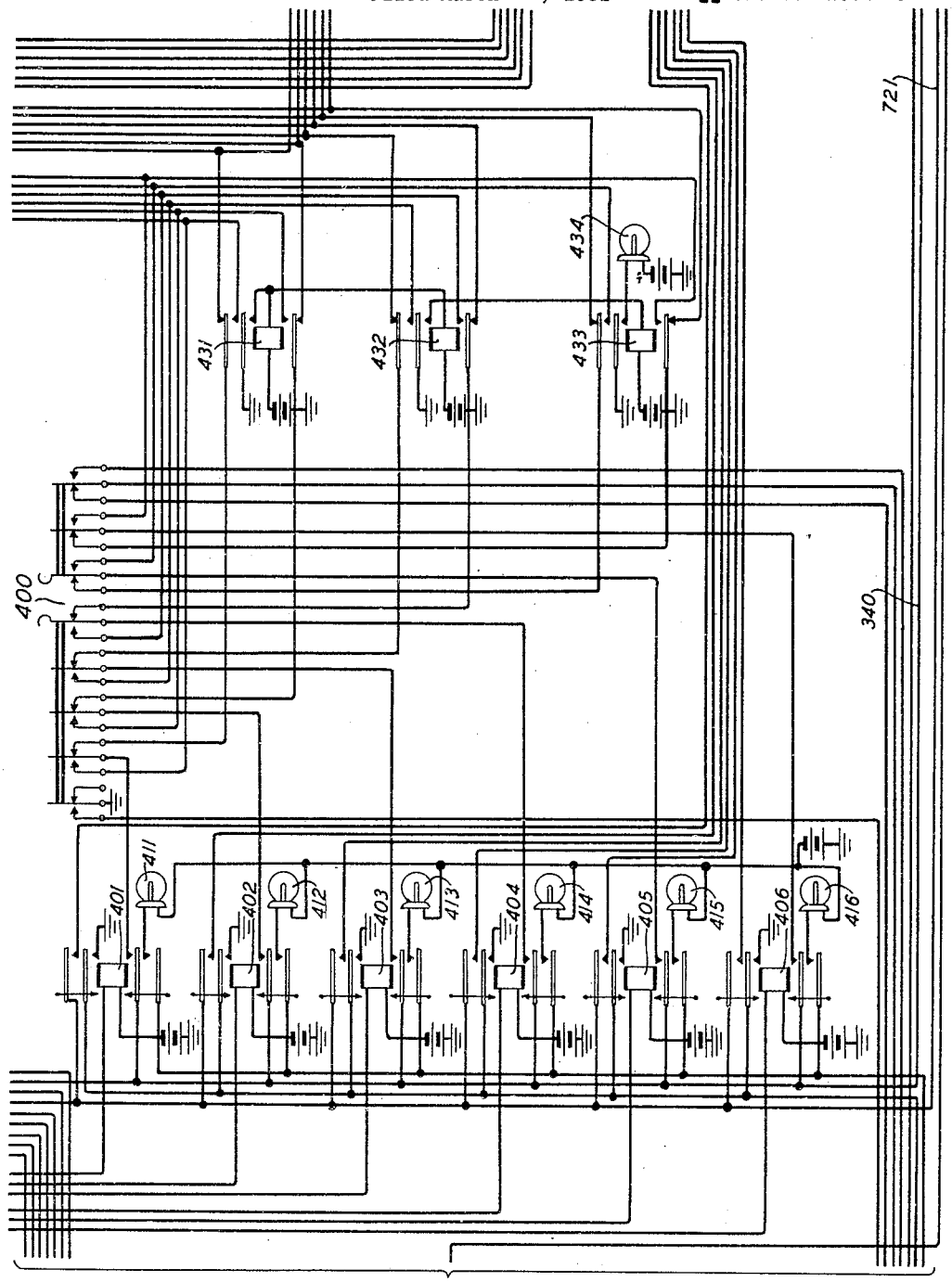
Figure 5:
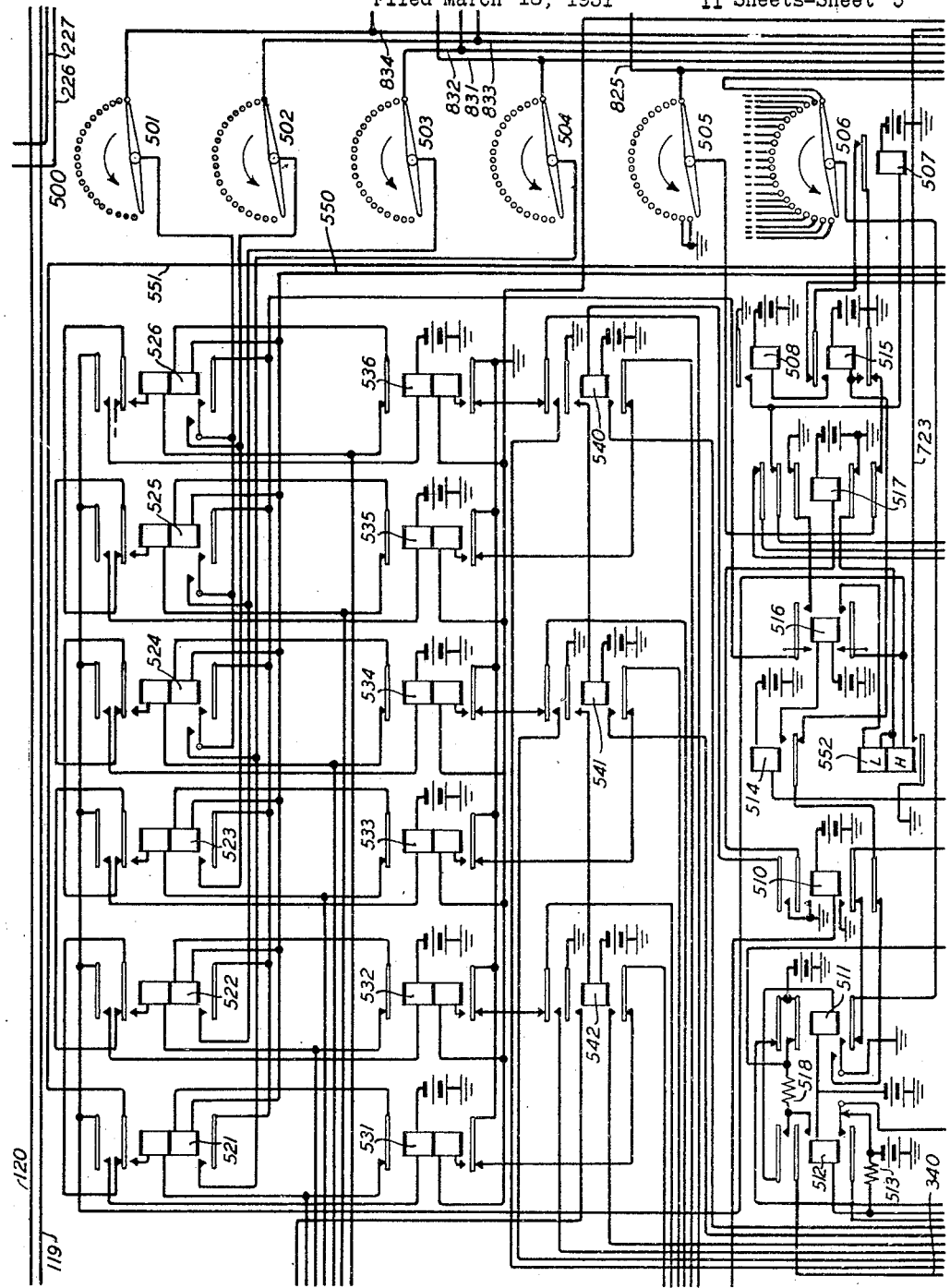
Figure 6:
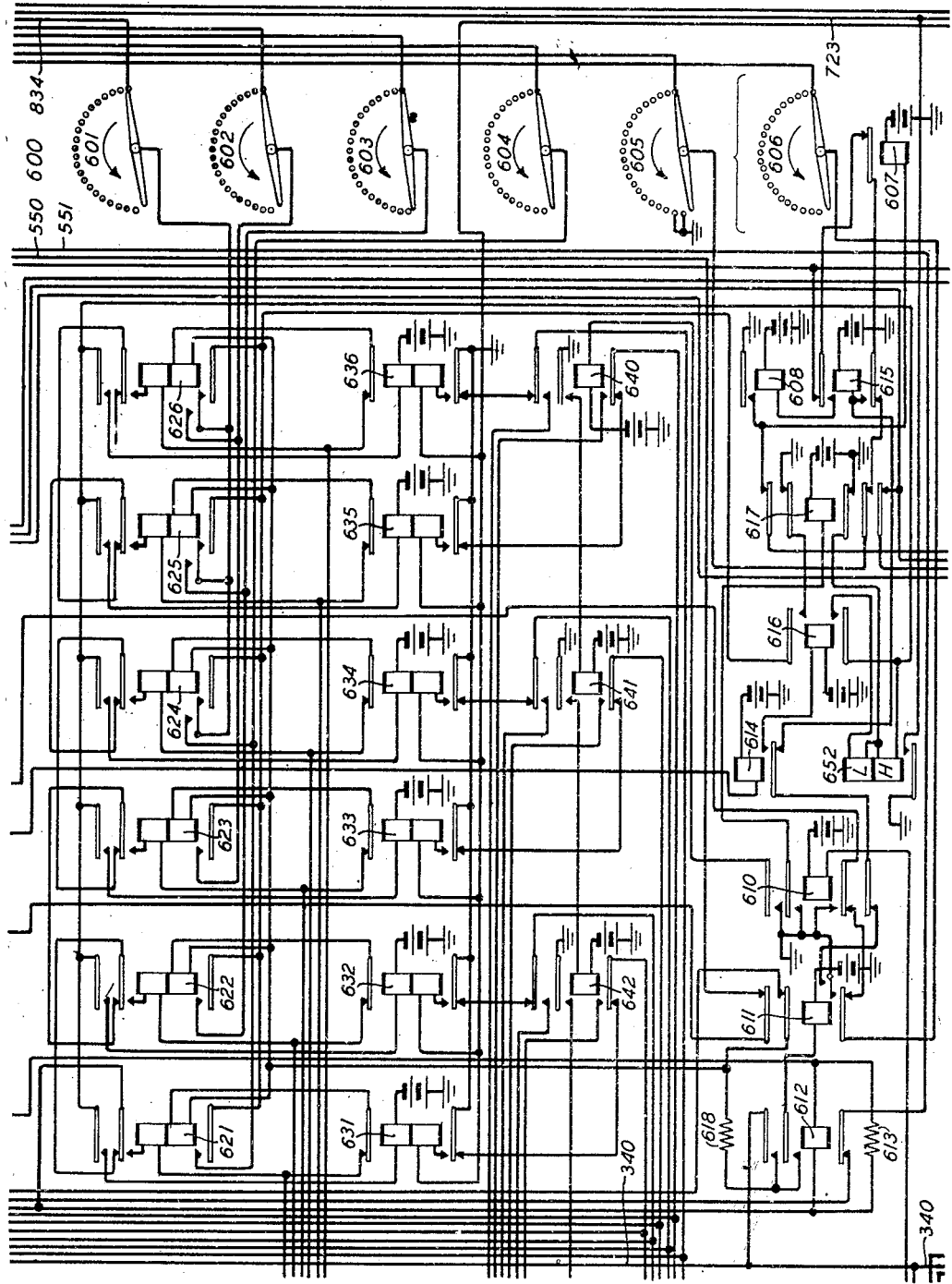

Each operator is provided as shown in Fig. 2 with a receiving circuit 200. When the operator is at her desk, she attaches her headset 220 to the position circuit by means of plug 221 and jack 222 in the usual manner, operating relay 224. Relay 224 in turn operates relay 203 which marks the desk available.

The desks of the order turret are in effect divided into three groups by the provision of the three switches individual to the trunk circuit. In order to secure even distribution of calls over all three groups, the distribution control circuit of Fig. 11 prepares a circuit for causing the operation of a particular switch in all trunks, which circuit is completed when the start circuit directs the trunk to start hunting. When the desk has been found, the switch 1100 in the distribution circuit is advanced to prepare the circuit for causing the operation of a different switch in all of the trunk circuits.

An alarm circuit associated with the allotter has been omitted but is disclosed and described fully in the above identified Carpenter et al. patent.

Without attempting to trace the circuits in detail, an outline of the operation of a successful call will first be given. The application of ringing current to the trunk at the central office causes the operation of relay 110, in turn operating relays 130 and 114. Relay 114 operates relay 301 and also marks the trunk to the storing circuits. Relay 301 operates cut-in relay 521 which locks through the winding of relay 512, in turn operating relays 511, 514 and 516. With relays 516 and 521 operated relay 811 in the associated storing circuit is operated. This relay causes switch 800 to hunt for the trunk and closes a test circuit by way of brush 802 to the winding of relay 816. Relay 816 in turn operates relays 817, 818, 810 and 819 thus indicating to the start circuit that a call is waiting by grounding conductors 820 and 821. Ground connected to conductors 820 and 821 causes the operation of relays 910 and 1010. With the operator at her position and idle, so that ground is connected to conductors 226 and 227 relays 914 and 1014 are operated, in turn operating relays 915 and 1015. The operation of these relays advances switch 900 or 1000, depending on which is in service, and relay 913 or 1013 tests whether the next storing circuit still has a call stored on it. If so, relay 913 or 1013 operates, stopping the switch, and ground is connected through relay 916 or 1016 to conductor 823 and thence to conductor 119 and the winding of relay 124 as an indication to the trunk that it may hunt for an idle receiving circuit. Such a circuit is indicated by battery connected to the terminal of brush 103 or 106 or the corresponding brushes of switches 150 and 160. Relay 124 connects ground to the lower winding of relay 131 and the corresponding relays associated with switches 150 and 160. Assuming that the distribution control switch 1100 is in position 1 relays 1110 and 1111 will be operated and the circuit of relay 131 completed to battery. Therefore, switch 100 hunts. When the position is found switch 100 is brought to rest, extending the talking conductors to the attendant's telephone, after she has been warned by two short tones that a call is incoming. It is apparent from the foregoing that the direct operation involved in allotting a call to an idle operator is comparatively simple although the apparatus involved is somewhat intricate. A more detailed discussion of the circuit will now be given.

Assuming that the subscriber at substation 111 wishes to give an order to the department store at which the order turret is located, she will give the directory number of the order turret to the operator who answers her call. When the connection has been established with an idle trunk outgoing to the order turret, ringing current will be applied to the trunk, operating relay 110 over a circuit which may be traced from the tip of cord 132, tip of jack 133, outer upper back contact of relay 134, inner upper back contact of relay 135, through the winding of relay 110, condenser 123, inner lower back contact of relay 135, lower back contact of relay 134, ring of jack 133, to the ring of cord 132. Relay 110 operates relay 130 in a circuit over its contact to ground at the upper back contact of relay 115 and relay 130 locks to that ground independent of the contact of relay 110, so that relay 130 remains operated although relay 110 is intermittently operated under the control of the ringing current. Relay 130 operates relay 114. Relay 114 closes an obvious path for lamp 136, indicating that the trunk is busy, and connects ground from the upper back contact of relay 115, over the outer upper front contact of relay 114, outer upper back contact of relay 116 through resistance 117 to conductor 126 and the winding of relay 301 to initiate the operation of the allotter. It also connects ground over the two upper back contacts of relay 116 to conductor 119 to mark the trunk as calling to the storing circuits.

Relay 301 in operating closes a circuit from ground at the lower back contact of relay 700, conductor 340, inner lower contact of relay 301, contact 321 of transfer key 300, upper back contact of relay 331, upper back contact of relay 531, lower winding of relay 521, conductor 550, outer upper contact of relay 611, inner upper contact of relay 511 to battery. Relay 521 operates in this circuit and locks in a circuit which extends from ground to the contact of relay 331 as above traced and thence through the upper winding and inner upper contact of relay 521, conductor 551, lower contact of relay 612 to battery through the winding of relay 512 and resistance 513 in parallel. Relay 512 operates, connecting ground from conductor 340 through resistance 518 to the inner upper contact of relay 511, shunting the operating winding of relay 521 and any other cut-in relay which may be operated at this time. It also closes a circuit over its two upper contacts for relay 511 and at its lower contact shunts the winding of relay 612 and removes battery from the locking circuit of relays 621 to 626.

Relay 511 in operating opens the operating circuit for the cut-in relays of both allotters A and B. It also prepares two circuits, one of which tests to determine whether the allotter switches 500 and 600 are in synchronism, that is, are engaging the same storing circuit and the other of which serves to bring switch 500 into synchronism with switch 600. The first circuit may be traced from battery through the winding of relay 514, inner lower contact of relay 610, lower back contact of relay 611, brush 606 and the terminal on which it is standing, which is cross-connected to the corresponding terminal of brush 506, and thence over brush 506, lower front contact of relay 511 to ground. If brushes 506 and 606 are standing on corresponding terminals relay 514 operates and the second circuit is ineffective. If this is not the case, the circuit closed by relay 511 over its innermost lower contact, outer back contact of relay 510, back contact of relay 514, winding of relay 515 to battery is completed. Relay 515 in operating extends its operating ground over the back contact of stepping magnet 507, upper front contact of relay 515, winding of relay 508 to battery. Relay 508 closes a circuit for magnet 507 which operates, opening the circuit of relay 508. Relay 508 releases, in turn releasing magnet 507 and stepping the brushes of allotter switch 500 to the next storing circuit. This reciprocal action continues until brush 506 engages the terminal corresponding to that engaged by brush 606 or until the timing relays function. If the call were incoming over a trunk belonging to a group served normally by the B allotter, switch 600 would be brought into synchronism with switch 500 in a corresponding manner.

Assuming that the switches are in synchronism and that relay 514 operates, a circuit is closed from ground over the innermost lower contact of relay 511, outer lower contact of relay 510, front contact of relay 514, winding of relay 516 to battery.

When relay 301 operated it closed a circuit from battery through the winding of relay 720, conductor 721, outer upper front contact of relay 301, lower back contact of relay 542, lower back contact of relay 531, assuming that this is the first call in this group, to ground. The operation of relay 521 closes a circuit from ground at the inner lower contact of relay 517, lower winding of relay 552, outer upper front contact of relay 521 through the upper winding of relay 531 to battery. Relay 552 operates but relay 531 cannot, due to the high resistance of the winding of relay 552. With relay 552 operated a circuit is closed from battery at the lower front contact of relay 720, winding of relay 722, conductor 723, contact of relay 552 to ground. Relay 722 connects battery and ground to the winding of relay 724 which in turn connects battery over its contacts to the lower windings of relays 531 to 536 and 631 to 636 inclusive.

When relay 516 operates it connects the upper low resistance winding in parallel with the lower high resistance winding of relay 552 and relay 531 operates, connecting ground over its lower armature to its lower winding, remaining operated and locked as long as relay 720 remains operated. The circuit of relay 720 extends over the front contacts of operated group relays and the back contacts of the corresponding lock-out relays. Therefore, if the call in the group served by relay 301 is the only one awaiting attention at this time the operation of relay 531 will open the circuit of relay 720 and relay 531 will release following the release of relays 301 and 521. If a call is waiting in another group, for example, the group served by relay 404, the circuit of relay 720 will extend over conductor 721, outer upper contact of relay 404, upper back contact of relay 641, lower back contact of relay 634 to ground and relay 531 is held operated until after this second call has been served. A second call during this period in the group served by relay 301 would not be effective to hold relay 720 operated after the release of relay 404 since the operated contact of relay 531 holds open the circuit of relay 720.

Relay 516 also closes a circuit from ground over the inner upper contact of relay 517, upper contact of relay 516 to the lower armatures of the cut-in relays. With relay 521 operated this ground extends over the lower front contact of that relay, brush 504, conductor 831, inner lower contact of relay 810, winding of relay 811 and battery, thus initiating the operation of the storing circuit. The operation of relay 811 causes the operation of switch 800 to hunt for the trunk marked by ground over conductor 119 and determines that brushes 801 and 802 will be used to connect the storing circuit with the trunk circuit. Relays 521 to 526 identify the group to which the incoming trunk belongs to the storing circuit by connecting ground to one of the conductors 831 to 833 either alone or in combination with conductor 834, thus operating one of the relays 811 to 813 and operating or not operating relay 814. Similar circuits are closed in the B allotter.

The circuit for operating switch 800 may be traced from battery through the winding of relay 815 over the back contacts of magnets 807 and 857, outer upper contact of relay 810, back contact of relay 816 to ground at the outer lower contact of relay 811. Relay 815 closes a circuit from ground over the back contact of relay 817, contact of relay 815, upper normal contact of relay 814, winding of magnet 807 to battery. Relay 815 and magnet 807 cooperate to advance switch 800 in search of the trunk marked. When this trunk is found the ground connected to conductor 119 is extended over brush 802, middle lower contact of relay 811, lower back contact of relay 814, outer upper back contact of relay 819, winding of relay 816 to battery. Relay 816 in operating disconnects ground from relay 815 and connects it to the upper winding of relay 817 and battery. Relay 817 in operating closes a circuit from ground over its upper front contact to the winding of relay 818. It also closes a circuit over its lower front contact to lock relay 811. Relay 818 in operating closes an obvious circuit for relays 810 and 819. Relays 818 and 819 control circuits for indicating to the signal circuit that a call has been stored. This signal circuit is disclosed and claimed in United States patent of J. F. Dahl et al. No. 1,823,091, granted September 15, 1931. Relay 818 also closes a circuit for interlocking the trunk and storing circuit from ground over its outer upper contact, lower winding of relay 817, inner upper back contact of relay 814, innermost upper contact of relay 811 to brush 801, conductor 120, lower back contact of relay 115 to the winding of relay 116.

Relay 116 operates in this circuit, disconnecting ground from the winding of relay 301 permitting that relay to release. It also disconnects ground from conductor 119 but relay 817 is already held operated and is therefore unaffected by the release of relay 816. In addition relay 116 also prepares a circuit from battery through the winding of relay 124, upper front contact of relay 116 to conductor 119. The trunk circuit now awaits the action of the start circuit.

Relay 810 in operating opens the circuit of relay 815 to prevent switch 800 from moving out of engagement with the trunk of Fig. 1. It also disconnects the control conductors 831 to 834 from relays 811 to 814. Relay 819 connects ground over its outer lower contact to conductor 825, brush 505, lower back contacts of relays 517 and 515, back contact of magnet 507, upper back contact of relay 515 to the winding of relay 700. This circuit also extends in parallel from conductor 825 over brush 605, middle lower back contact of relay 617, lower back contact of relay 615, back contact of magnet 607, upper back contact of relay 615, to the winding of relay 700. Relay 700 in operating disconnects ground from conductor 340 thus releasing cut-in relay 521 and in turn the lock-out relay 531 unless another call is waiting. Relay 700 also closes a circuit over its outer lower front contact, middle upper contact of relay 517, to the winding of the magnet 507 and battery and a second circuit over its inner lower front contact, upper back contact of relay 617 to the winding of magnet 607 and battery. These two magnets operate and when both are operated open the circuit of relay 700 which releases in turn releasing the magnets and advancing the allotter switches to preallot the next storing circuit.

Relay 818 in addition to the functions above described connects ground over its inner contacts to conductors 820, 821 and 822 leading to the start circuit. The connection of ground to conductors 820 and 821 completes circuits for relays 910 and 1010 which both operate. As soon as relay 910 operates it closes a circuit from battery through the winding of relay 908, back contact of magnet 907, back contact of relay 913, brush 902 and its strapped off-normal terminals, inner lower back contact of relay 912, right normal contact of key 911 to ground at the outer upper contact of relay 910. Relay 1010 attempts to prepare a similar circuit for relay 1008 but it will be remembered that only one of the switches 900 and 1000 functions at a time and it is assumed that switch 900 is the one now in use. The circuit closed by relay 910 is therefore effective while the attempted closure by relay 1010 is ineffective, since brush 1002 is engaging the twenty-second terminal which is disconnected. Relay 908 in operating closes a circuit for magnet 907 which opens the circuit of relay 908 and thereby the circuit of magnet 907, and advances the start circuit to the next storing circuit. A circuit is then closed from battery through the winding of relay 913, outer lower back contact of relay 912, brush 901 to conductor 822 which is grounded on the operation of relay 818. Relay 913 operates, opening the circuit of relay 908 and preventing the further advance of switch 900.

Relay 910 also prepares a circuit from battery through the winding of relay 914, outer upper back contact of relay 940, outer lower contact of relay 910 to conductor 226 which terminates in ground at an operator's position, if that operator is idle.

Referring for the moment to the circuit of Fig. 2, it will be seen that the connection of headset 220 to the telephone circuit completes a circuit from ground through the contacts of jack 222 and plug 221 and the operator's transmitter to battery through the winding of relay 224. Relay 224 closes a circuit from ground over its outer left contact, right back contact of relay 202, outer lower normal contact of key 201, lower normal contact of key 209, inner lower normal contact of key 240, lower normal contact of key 241, winding of relay 203 to battery. Relay 203 in operating connects ground over its middle left contact to conductors 226 and 227. It also connects battery through relay 245 and resistance 246 in parallel, outer right contact of relay 203, normal contact of key 244, inner upper normal contact of key 201 to conductor 213 to mark the receiving circuit idle to the trunk circuits. In addition, relay 203 connects ground from the inner left contact of relay 224, over the outer left and inner right contacts of relay 203, to conductor 251 to mark the position idle to the distribution control circuit. Key 201 is a release key and key 209 is a holding key. Keys 240 and 241 connect the desk with a trunk outgoing to the central office or to the associated P. B. X. and relay 202, as will be shown hereinafter, is operated during the time that the incoming trunk is connected with the receiving circuit. Therefore, it is apparent that the operation of any one of the keys or the association of a trunk with a receiving circuit prevents the desk from being marked idle to the start circuit, the trunk circuits or the distributing circuit.

The circuit of relay 914 extends in multiple to all desks so that as long as one operator is idle the circuit will be completed whenever relay 910 operates. Relay 914 also closes an obvious circuit for relay 915. Relay 1010 closes a similar circuit for relay 1014 to conductor 227 which also operates if an operator is available and closes an obvious circuit for relay 1015. Relay 914 also closes a parallel circuit for relay 1015 and relay 1014 closes a parallel circuit for relay 915, thus securing the operation of these two relays even though one of the relays 910, 914, 1010 or 1014 fails to operate.

The operation of relay 913 as above described closes a circuit from battery through the winding of relay 918, back contact of relay 919, inner upper front contact of relay 915, front contact of relay 913, brush 902, back contact of relay 912, right normal contact of key 911 to ground at the uppermost contact of relay 910. Relay 918 initiates a timing operation for the purpose of determining whether the start circuit functions properly. The operation of the timing relays is fully described in the above identified patent to Carpenter et al.

At the time relay 914 operates, it closes a circuit from ground at the inner upper back contact of relay 940, through the winding of relay 916, inner lower contact of relay 914, lower back contact of relay 917, brush 906, conductor 823, upper front contact of relay 819, lower back contact of relay 814, middle lower contact of relay 811, brush 802, conductor 119, upper front contact of relay 116, winding of relay 124 to battery as an indication to the trunk that it may hunt for an idle operator's position. This same circuit is also closed at the lower contact of relay 1014 and a similar circuit is prepared by both relays 1014 and 914 to brush 1006 which is ineffective because of the position switch 1000. The presence of relay 916 in this circuit reduces the potential on the terminal of brush 802 through which the circuit passes so that it will not interfere with the operation of storing circuit switches hunting over terminals multipled thereto in search of other trunks. Relay 916 in closing its front contact renders this circuit independent of the contacts of relays 914 and 1014.

Relay 124 in operating prepares an operating circuit for relay 131. This circuit may be traced from ground over the inner lower and upper back contacts of relay 141, back contact of relay 140, middle upper front contact of relay 124 to the lower winding of relay 131. Parallel circuits are closed over the outer and inner upper front contacts of relay 124 to the windings of similar relays associated with switches 150 and 160. At the same time relay 124 prepares a locking circuit for these three relays extending from ground over its inner lower front contact through the winding of relay 140 in parallel to the locking armatures of relay 131 and the corresponding relays of switches 150 and 160. In addition relay 124 prepares a test circuit from ground over its outer lower front contact through the winding of relay 125, lower front contact of relay 116 to the middle upper front contact of relay 131 and in parallel to corresponding contacts of the relays associated with the other two switches. Which of the three switches is to be employed, and in consequence which of the three groups of order desks is to be hunted over, is determined by the distribution control circuit of Fig. 11.

When relay 203 operated, connecting ground to conductor 251, it closed a circuit for relay 1112. Relay 1112 in turn operates relay 1113. Relay 1113 connects relay 1111 to the first, fourth, seventh, tenth, thirteenth, sixteenth, nineteenth and twenty-second contacts of brush 1101. Assuming that brush 1101 is in the position shown, ground from brush 1101 causes the operation of relay 1111 which in turn connects battery over its contact through the winding of relay 1110 to the first terminal of brush 1102 which is also grounded, operating relay 1110. With relay 1110 operated, battery is connected over the front contact of relay 1111, upper front contact of relay 1110 to conductor 1114 and the lower winding of relay 131.

Therefore, when relay 124 operates connecting ground to the lower winding of relay 131, that relay operates to cause the operation of switch 100. Relay 131 locks to battery over its middle lower contact, upper winding and inner upper contact, winding of relay 140 to ground at the inner lower contact of relay 124. Relay 140 in operating closes a circuit from ground at the upper back contact of relay 125, lower front contact of relay 140, back contact of magnet 107 and thence over the back contacts of the corresponding magnets of switches 150 and 160 to the winding of relay 108 and battery. Relay 140 also disconnects ground from the contacts of relay 124 to prevent the operation of either of the relays corresponding to relay 131 in the other two switches. Relay 108 in operating closes a circuit from ground over its front contact, inner lower contact of relay 131 to the winding of magnet 107. Parallel circuits extend to the inner lower contacts of the relays corresponding to relay 131, but since these relays are not operated, switches 150 and 160 remain at rest. Magnet 107 in operating opens the circuit of relay 108 which releases in turn releasing magnet 107, whereupon, the circuit of relay 108 is reclosed, and the relay and magnet operate and release in turn to advance switch 100 in search of an idle receiving circuit as indicated by the connection of battery to conductor 213 as above described.

When such a receiving circuit is found, a circuit is closed from battery over conductor 213, brush 103, middle upper contact of relay 131, lower front contact of relay 116, winding of relay 125 to ground at the outer lower contact of relay 124. Relay 125 in operating opens the circuit of relay 140, in turn releasing relay 108, and magnet 107, bringing switch 100 to rest. Relay 125 closes a circuit from ground over its front contact, winding of relay 141 to battery. Relay 141 connects the tip and ring conductors from the repeating coil 112 through the front contacts of relay 131 to the tip and ring conductors of the receiving circuit and through the windings of relay 206 and the winding of relay 207. In addition relay 141 disconnects ground from contacts of relay 124, opening the energizing circuit of relay 131, but connects it to the locking circuit of relay 131, holding that relay operated. Relay 206 in the receiving circuit operates, closing an obvious circuit for relay 202 which locks over its inner left contact and the inner lower normal contact of key 201 to the outer left front contact of relay 224. Relay 202 opens the circuit of relay 203 and that relay releases, removing the idle indication from the start, trunk and distributing circuits. Relay 202 also connects ground over the inner lower back contact of relay 208 to the winding of relay 242 which connects ground to interrupter 243 and the primary circuit of coil 229. In addiiton it connects ground to lamp 252, lighting that lamp as a busy signal.

The connection of relay 206 and 207 across the tip and ring conductors causes the operation of relays 142 and 143 in the trunk circuit. Relay 142 in turn operates relay 144 which in turn operates relay 115. Relay 115 in operating connects resistance 146 across the tip and ring conductors, thus closing a direct current path in which the tripping relay of the cord circuit can operate to disconnect ringing current from the trunk. Relay 115 also opens the circuit of relay 116 and the locking circuit of relay 130 which releases in turn releasing relay 114. With relay 114 released, the resistance 146 is removed from across the tip and ring conductors. A circuit is also closed from battery, through the winding of relay 135, back contact of relay 114, to ground at the lower front contact of relay 144, or the inner upper front contact of relay 115. With relay 115 operated, the incoming tip and ring conductors are connected together through the windings of the repeating coil 112, front contact of relay 143 and resistance 147. A signal is thereby transmitted back to the calling office for supervisory purposes.

The operation of relay 135 reverses the connection of battery and ground through the right windings of repeating coil 112 to the winding of polarized relay 207 so that relay 207 now operates. Relay 207 in operating closes a circuit from battery through the winding of relay 228, front contact of relay 207, inner upper back contact of relay 208, to ground at the right front contact of relay 202. Relay 228 closes a circuit through the secondary winding of tone coil 229 over its right contact, outer lower back contact of relay 208, inner upper normal contact of key 209, outer lower normal contact of key 240 through the repeating coil 223, upper normal contact of key 240, outer upper normal contact of key 209, outer upper back contact of relay 208, normal contact of relay 230 to ground at the inner left contact of relay 228. A tone is therefore transmitted to the operator. Relay 228 also closes an obvious circuit for relay 230 which is slow to operate, and after an interval opens its normal contact, and disconnects the tone from the operator's receiver. Relay 230 also closes a circuit for relay 231 which is also slow to operate and after another interval recompletes the secondary circuit of the tone coil over the normal contact of relay 232, left contact of relay 231, alternate contact of relay 230 to ground at the inner left contact of relay 228. Relay 231 also operates relay 232 which, after an interval, measured by its slow-to-operate character, again opens the tone circuit completing the second of the so-called zip tones. It also extends the circuit closed from ground at the inner left contact of relay 228 over the alternate contact of relay 232 to the winding of relay 208. If key 235 is operated it likewise operates peg count meter 234 and relay 233. Relay 208 opens the circuit of relays 228 and 242 and closes a locking circuit for itself over its alternate contact to ground at the inner right contact of relay 202. It likewise extends the trunk conductors to the headset 220. The order clerk or operator may now talk with the customer and record the order.

The disconnection of relay 116 from conductor 120 opens the circuit of relay 817 in the storing circuit. Relay 817 in releasing opens the circuit of relay 818 in turn releasing relays 810 and 819. Relay 817 also opens the locking circuit of relay 811 and the storing circuit is restored to normal. The release of relays 817 and 818 opens the circuits of relays 913, 910 and 1010 which in turn release the remaining relays of the start circuit, the switch 900 remaining in the same position until the reception of a call causes it to advance to start another trunk.

If other calls are stored and waiting, relays 910 and 1010 remain operated, but the release of relay 913 permits the advance of switch 900 to the next storing circuit. When an operator becomes idle relay 914 operates to transmit the starting signal to the trunk.

It will be remembered that battery was connected to conductor 213 over the inner upper normal contact of key 201, right contact of key 244, outer right contact of relay 203, through the winding of relay 245 and resistance 246 in parallel. When the receiving circuit is found relay 245 operates in series with relay 125 and locks over its right contact to the circuit of relay 125 independent of relay 203. Relay 245 connects ground over its inner left contact to conductor 247. If there are idle receiving circuits in the second and third groups of desks, relays 1122 and 1132 will be operated over circuits similar to that previously traced over conductor 251. The connection of ground to conductor 247 therefore closes a circuit over the upper front contact of relay 1132 and over the inner lower contact of relay 1122 to the winding of relay 1115. With relay 1110 operated as above described, relay 1116 is also operated and a circuit is closed from ground over the contacts of relays 1116 and 1115 to the winding of magnet 1104. Magnet 1104 operates in this circuit. When relay 116 releases, the circuit of relays 125 and 245 is opened and relays 245 and 1115 release, in turn releasing magnet 1104 and advancing switch 1100 to its next position. The advance of switch 1100 opens the circuit of relay 1110 which releases, in turn releasing relay 1116 and opening the operating circuit of magnet 1104. With brush 1102 in position 2, and relay 1123 operated from relay 1122, relays 1121, 1120 and 1126 are operated in turn. A circuit is now prepared from battery over the contact of relay 1121, upper contact of relay 1120 to conductor 1124 which extends in parallel to the relays corresponding to relay 131 associated with the second switch of each trunk, which corresponds to switch 150. Similarly when a receiving circuit of the second group has been taken for use relay 1125 is operated from the receiving circuit, if there are idle operators in Groups 1 or 3 and together with relay 1126 advances the switch 1100 to position 3. The third group of desks is allotted in position 3 and following the selection of a receiving circuit in the third group switch 1100 is advanced to again preallot Group 1. If no attendants are idle in two of the three groups, for example, in Groups 2 and 3, the connection of ground to conductor 247 is ineffective and Group 1 continues to be used alone. If there should be no desks available in Group 2 (following the selection of a desk in Group 1) but idle desks exist in Group 3, ground over the front contact of relay 1133 and the back contact of relay 1123 will be connected to the Group 2 terminals of brush 1103 to advance the switch to allot Group 3.

If, after talking with the customer, the operator at the order desk finds it necessary to have the assistance of a salesman in determining the details of an order or finds that the calling party really wishes to speak with a particular person served by a line appearing at the house private branch exchange, the order clerk may operate key 244 connecting ground through resistance 248 to battery through resistance 250 and then connecting conductor 213 to a point between the two resistances. Following the release of relay 116 conductor 213 is connected over the middle upper contact of relay 131, lower back contact of relay 116, inner upper front contact of relay 141, winding of relay 145 to ground at the back contact of relay 130. The battery potential supplied by the potentiometer is sufficient to operate relay 145 but insufficient to stop a switch which may be hunting for an idle position. Relay 145 closes a circuit from battery over the back contact of relay 134, contact of relay 145 to lamp 172 which is located at the switchboard of the house branch exchange as a signal to the operator at that switchboard. The branch operator then inserts the plug of a cord circuit at her position into the jack 170. A circuit is thereupon closed from ground on the sleeve of the operator's cord circuit, sleeve of jack 170, contact 171, winding of relay 148 to battery. Relay 148 connects ground over its lower contact to the winding of relay 134 and battery. Relay 148 also closes at its upper front contact a shunt around the front contact of relay 143. Relay 134 extinguishes lamp 172 and connects the tip and ring of jack 170 to the tip and ring of the trunk so that the branch exchange operator may converse with the calling subscriber and the order operator and extend the branch connection to any person desired. If the connection to the branch exchange was merely for assistance, when the consultation is completed the branch exchange line releases and the branch operator removes her cord circuit releasing relays 148 and 134. The restoration of key 244 releases relay 145 and the remainder of the order may be completed.

When the conversation is completed the release by the calling subscriber is ineffective on the trunk circuit. The operator in order to release, operates key 201 thereby closing a circuit from battery over the normal contact of key 210, winding of relay 249, upper operated contact of key 201 to ground at the inner right contact of relay 202. Relay 249 in operating disconnects the tip conductor from the operator's telephone. It also connects ground over its front contact through the left winding of relay 206 to the tip conductor and through the winding of relay 207 and the right winding of relay 206 to the ring conductor. Relay 143 is held operated in this circuit but relay 142 is shunted and released. Relay 142 in releasing, releases relay 144 which in turn releases relay 115 and relay 135. The release of relays 115 and 144 releases relay 141 and disconnects relay 143 from the receiving circuit thereby releasing relay 143. The release of relay 143 opens the direct current circuit over the tip and ring conductors to the central office and thereby transmits a release signal to the central office operator. If the central office is a dial office, the release of relay 143 initiates the automatic release of the switching apparatus.

The failure of a calling subscriber to release does not prevent the release of the trunk circuit from the receiving circuit. It is to be noted that, if a connection has been established to a telephone connected to the private branch exchange, relays 148 and 134 are operated to connect the calling subscriber to the branch exchange switchboard. The release of the receiving circuit from the trunk circuit by the operation of key 210 does not in any way affect the branch connection, and the operator can free her desk to answer other calls during the time that the calling subscriber is engaged with the branch exchange.

The operation of key 201 opens the locking circuit of relay 202, while the release of relay 141 opens the operating circuit of relay 202. Relay 202, therefore, releases, extinguishing lamp 252 and lighting lamp 253. Key 201 also opens the circuits of relays 203 and 245 to prevent marking the desk idle with the release key operated. When the key is restored, relay 203 operates, and again prepares the circuit of relay 245.

The order operator can signal the central office operator by operation of key 210, which closes a circuit from battery over the inner operated contact of key 210 to the winding of relay 205, outer upper normal contact of key 201 to ground at the right front contact of relay 202. Key 210 and relay 205 jointly connect battery over the outer operated contact of key 210, inner contact of relay 205 through the right winding of relay 206 to the ring conductor and through the winding of relay 207, and the left winding of relay 206 to the tip conductor, thus holding relay 142 operated and shunting relay 143, which opens the supervisory circuit, signaling the operator at the central office in synchronism with the operation of key 210.

It will be noted that if, following the finding of a clerk's position the tip and ring conductors are not properly connected through, for example because of poor contact at the switch, relay 142 cannot operate and in turn cannot operate relay 115 so that relay 116 does not release to free the storing circuit. The timing relays of the start circuit will advance the start circuit to the next storing circuit in the manner described in the above identified Carpenter patent. After all intermediate calls have been extended to the order desks the start circuit will again associate itself with the storing circuit attached to the trunk previously connected to, and another attempt will be made to connect with the order desk.

Figure 7:
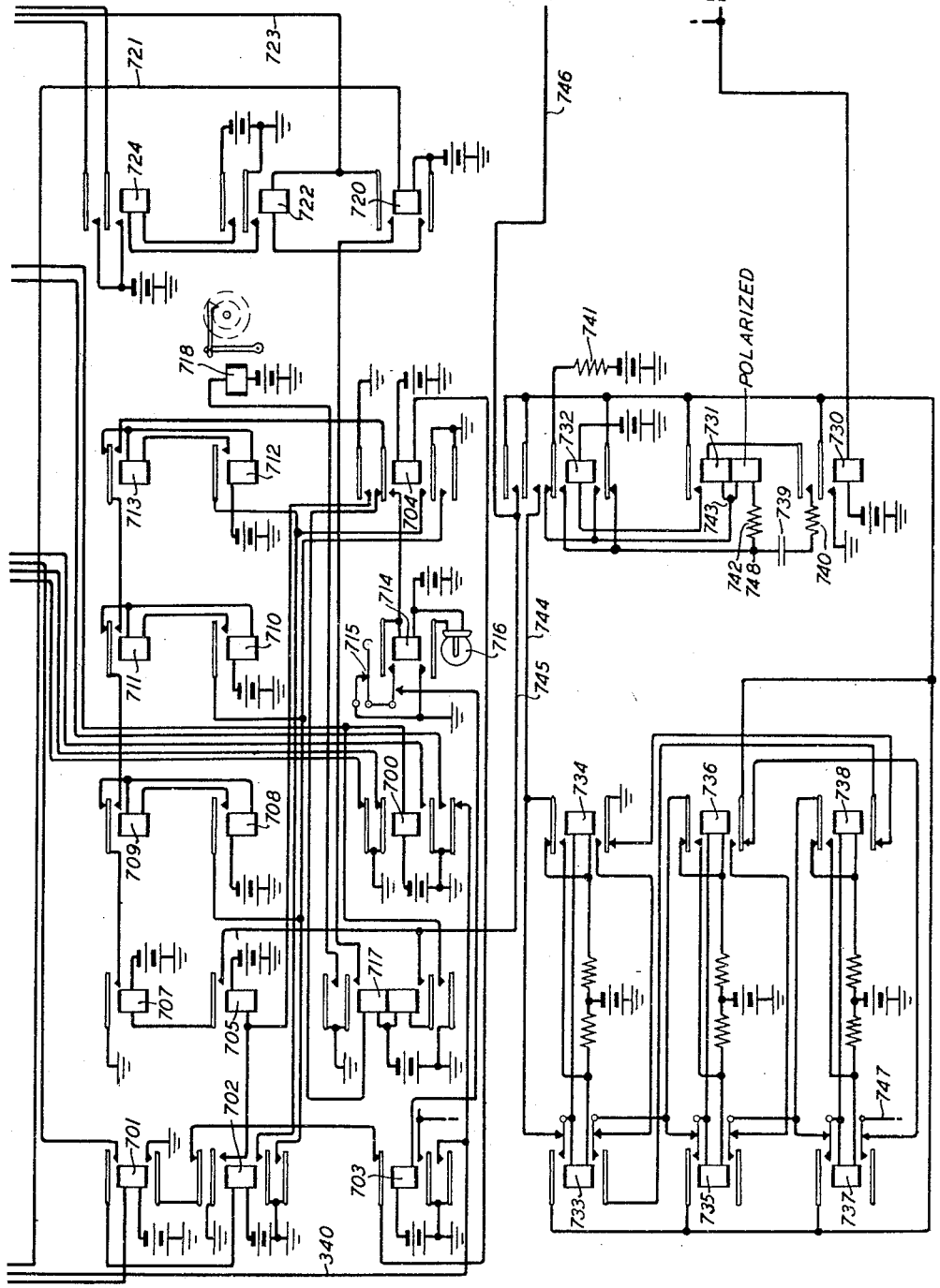

The relays 730 to 738 inclusive of Fig. 7 constitute a relay interrupter for supplying interrupted ground to the allotter and the start circuit. Relay 730 is operated as soon as either relay 1014 or 914 operates in the start circuit as shown. Two other circuits for operating this relay are also provided but not shown, one of which extends to the allotter alarm circuit and the other of which extends to the signal circuit. Therefore, whenever a call is awaiting allotment or is stored or is being directed to an operator's position relay 730 is operated. The operation of relay 730 connects ground over the lower back contact of relay 732, to the junction point 748 whence two circuits extend, one through resistance 742 and the lower winding of relay 731, and the other through condenser 739, resistance 740, outer upper contact of relay 730, and the upper winding of relay 731, to junction point 743 and over the upper back contact of relay 732 through resistance 741 to battery. The windings of relay 731 are so arranged that the charging current through the upper winding opposes and delays the effect of the steady current through the lower winding. When a steady state is reached relay 731 operates. The operation of relay 731 closes a circuit from ground over the inner contact of relay 730, contact of relay 731, winding of relay 732 to battery. The operation of relay 732 transfers battery through resistance 741 from the junction points 743 to point 748 and transfers ground from the junction 748 to junction 743 thus reversing the current flow through the windings of relay 731. Condenser 739 is now discharged and charged in the opposite direction. When the current flow for charging condenser 739 ceases, relay 731 is energized in such a direction as to cause it to open its contact and relay 732 releases. With relay 732 released, the two circuits initially traced through the windings of relay 731 are restored and the relay recloses its contact, again operating relay 732. Thus relays 731 and 732 are intermittently operated as long as relay 730 continues to hold their circuits closed. Each time that relay 732 operates it connects ground from the front contact of relay 730 over its middle upper front contact to conductor 744 and over its outer upper front contact to conductors 745 and 746. The connection of ground to conductor 745 controls the operation of the timing relays 708 to 713 of the allotter and the connection of ground to conductor 746 controls the timing relays 1024 etc. of the start circuit. The connection of ground to conductor 744 intermittently operates relays 733 and 734 and then releases them in turn. Similarly relay 734 operates and releases relays 735 and 736 and relay 736 in turn operates and releases relays 737 and 738. From the time that relay 730 operates until relay 736 is operated, ground is connected over the inner contact of relay 730, lower back contact of relay 736, lower back contact of relay 737, to conductor 747 which extends to the allotter alarm circuit and the signal circuit to control the timing relays in those circuits in place of the mechanical interrupters shown in the Carpenter patent above identified. When relay 736 operates, it opens this circuit and since the operation of relay 736 causes the operation of relay 737, this circuit remains opened until both relays 736 and 737 have been released whereupon the circuit is reclosed. The relays 733 to 738 are operated intermittently under the control of relays 731 and 732, thereby supplying slowly interrupted ground to the allotter alarm circuit and the signal circuit. Whenever no calls are awaiting attention, relay 730 is released and the timing relays controlled by it are not operated.

What is claimed is:

1. In a telephone system, a main exchange, a branch exchange, trunks connecting said main exchange and said branch exchange, operators' positions at said branch exchange, means in said main exchange for selecting an idle one of said trunks, means at said main exchange for applying ringing current to said selected trunk, means at said branch exchange for storing calls and directing them to said operators' positions in the order stored, and means responsive to the application of ringing current to said trunk to initiate said storing operation.

2. In a telephone system, a main exchange, a branch exchange, trunks connecting said main exchange and said branch exchange, operators' positions at said branch exchange, means in said main exchange for selecting an idle one of said trunks, means at said main exchange for applying ringing current to said selected trunk, means at said branch exchange for storing calls and directing them to said operators' positions in the order stored, said storing and directing means being responsive to the application of ringing current to said trunk, and means in said trunk responsive to the connection of said trunk with one of said operators' positions for causing the disconnection of ringing current from said trunk.

3. In a telephone system, a main exchange, a branch exchange, trunks connecting said main exchange to said branch exchange, operators' positions at said branch exchange, operators' telephone circuits at said positions, means in said main exchange for selecting an idle one of said trunks, means at said main exchange for applying ringing current to said selected trunk, means at said branch exchange for storing calls and directing them to said operators' positions in the order stored, said storing and directing means being responsive to the application of ringng current to said trunk, means in said trunk responsive to the connection of said trunk with one of said operators' positions for causing the disconnection of ringing current from said trunk and for supplying current to said position, means responsive to said last mentioned means to reverse the flow of current between said trunk and said position, and means controlled by said current reversal to connect the operators' telephone circuit with its position equipment.

4. In a telephone system, a main exchange, a branch exchange, trunks connecting said main exchange to said branch exchange, operators' positions at said branch exchange, operators' telephone circuits at said positions, means in said main exchange for selecting an idle one of said trunks, means at said main exchange for applying ringing current to said selected trunk, means at said branch exchange for storing calls and directing them to said operators' positions in the order stored, said storing and directing means being responsive to the application of ringing current to said trunk, means in said trunk responsive to the connection of said trunk with one of said operators' positions for causing the disconnection of ringing current from said trunk and for supplying current to said position, means effective if the talking conductors connecting said trunk and said position equipment are uninterrupted to reverse the flow of current between said trunk and said position, and means controlled by said current reversal to connect the operators' telephone circuit with its position equipment.

5. In a telephone system, a main exchange, a branch exchange, trunks connecting said main exchange to said branch exchange, operators' positions at said branch exchange, operators' telephone circuits at said positions, means in said main exchange for selecting an idle one of said trunks, means at said main exchange for applying ringing current to said selected trunk, means at said branch exchange for storing calls and directing them to said operators' positions in the order stored, said storing and directing means being responsive to the application of ringing current to said trunk, means in said trunk responsive to the connection of said trunk with one of said operators' positions for causing the disconnection of ringing current from said trunk and for supplying current to said position, means effective if the talking conductors connecting said trunk and said position are interrupted to prevent the connection of said operator's telephone circuit with its position equipment, and means effective after a predetermined period to direct the call to another operator's position.

6. In a telephone system, a main exchange, a branch exchange, trunks connecting said main exchange to said branch exchange and terminating in finder switches, operators' positions in said branch exchange, operators' telephone circuits at said positions, means in said main exchange for selecting an idle one of said trunks, means at said main exchange for applying ringing current to said selected trunk, means at said branch exchange for storing calls and causing said automatic switches to hunt for an idle operator's position in the order stored, said last mentioned means being responsive to the application of ringing current to said trunk, means in said trunk responsive to the connection of said trunk with one of said operators' positions for causing the disconnection of ringing current from said trunk and for supplying current to said position, means effective if the talking conductors connecting said trunk and said position equipment are interrupted to prevent the connection of said operator's telephone circuit with its position equipment, and means effective after a predetermined time to cause said switch to again hunt for an idle operator's position.

7. In a telephone system, a main exchange, a branch exchange, trunks connecting said main exchange and said branch exchange and terminating in finder switches, operators' positions in said branch exchange, operators' telephone circuits at said positions, means in said main exchange for selecting an idle one of said trunks, means at said branch exchange for storing calls and causing said automatic switches to hunt for an idle operator's position in the order stored, said last mentioned means being responsive to the application of ringing current to said trunk, means in said trunk responsive to the connection of said trunk with one of said operators' positions for causing the disconnection of ringing current from said trunk and for supplying current to said position, and means effective if the talking conductors connecting said trunk and said position equipment are interrupted to prevent the connection of said operator's telephone circuit with its position equipment, and to cause said switch to repeatedly hunt for an idle operator's position at predetermined intervals.

8. In a telephone system, a main exchange, two branch exchanges, trunks originating at said main exchange and terminating in selector switches at one of said branch exchanges, operators' positions at said one branch exchange, signals individual to said trunks at the other of said branch exchanges, means in said main exchange for selecting an idle trunk, means at said one branch exchange for storing calls received over said trunks and for causing the selector switches of said trunks to find an idle operator's position in the order in which the calls are stored, and means under the control of said found position at said one branch exchange to operate the signal corresponding to the associated trunk at said other branch exchange.

9. In a telephone system, a main exchange, two branch exchanges, trunks originating at said main exchange and terminating in selector switches at one of said branch exchanges, operators' positions at said one branch exchange, signals individual to said trunks at the other of said branch exchanges, means in said main exchange for selecting an idle trunk, means at said one branch exchange for storing calls received over said trunks and for causing the selector switches of said trunks to find an idle operator's position in the order in which the calls are stored, and means under the control of said found position at said one branch exchange to operate the signal corresponding to the associated trunk at said other branch exchange, said last mentioned means comprising a key-controlled potentiometer.

10. In a telephone system, a main exchange, two branch exchanges, trunks originating at said main exchange and terminating in selector switches at one of said branch exchanges, operators' positions at said one branch exchange, signals individual to said trunks at the other of said branch exchanges, means in said main exchange for selecting an idle trunk, means at said one branch exchange for storing calls received over said trunks and for causing the selector switches of said trunks to find an idle operator's position in the order in which the calls are stored, means under the control of said found position at said one branch exchange to operate the signal corresponding to the associated trunk at said other branch exchange, a jack associated with said signal at said other branch exchange, a plug at said other branch exchange, and means responsive to the insertion of said plug in said jack to connect said jack with said trunk.

11. In a telephone system, a main exchange, two branch exchanges, trunks originating at said main exchange and terminating in selector switches at one of said branch exchanges, operators' positions at said one branch exchange, signals individual to said trunks at the other of said branch exchanges, means in said main exchange for connecting with an idle trunk, means at said one branch exchange for storing calls received over said trunks and for causing the selector switches of said trunks to find an idle operator's position in the order in which the calls are stored, means under the control of said found position at said one branch exchange to operate the signal corresponding to the associated trunk at said other branch exchange, a jack associated with said signal at an operator's position in said other branch exchange, a cord circuit at the position at said other branch exchange, means responsive to the association of said cord circuit with said jack to connect said jack with said trunk, and means to disconnect the operator's position at said one branch exchange from said trunk, said means being normally effective to transmit a release signal to said main exchange and means in said cord circuit to prevent the transmission of said release signal.

12. In a telephone system, a main exchange, two branch exchanges, trunks originating at said main exchange and terminating in selector switches at one of said branch exchanges, operators' positions at said one branch exchange, signals individual to said trunks at the other of said branch exchanges, means in said main exchange for connecting with an idle trunk, means at said one branch exchange for storing calls received over said trunks and for causing the selector switches of said trunks to find an idle operator's position in the order in which the calls are stored, means under the control of said found position at said one branch exchange to operate the signal corresponding to the associated trunk at said other branch exchange, a jack associated with said signal at an operator's position in said other branch exchange, a cord circuit at the position at said other branch exchange, means responsive to the association of said cord circuit with said jack to connect said jack with said trunk, and means to disconnect the operator's position at said one branch exchange from said trunk, said means being effective to transmit a release signal to said main exchange only if said jack is not connected with said trunk.

13. In a telephone system, a main exchange, two branch exchanges, trunks originating at said main exchange and terminating in selector switches at one of said branch exchanges, operators' positions at said one branch exchange, signals individual to said trunks at the other of said branch exchanges, means in said main exchange for selecting an idle trunk, means at said one branch exchange for storing calls received over said trunks and for causing the selector switches of said trunks to find an idle operator's position in the order in which the calls are stored, means under the control of said found position at said one branch exchange to operate the signal corresponding to the associated trunk at said other branch exchange, a jack associated with said signal at said other branch exchange, a plug at said other branch exchange, and means responsive to the insertion of said plug in said jack to connect said jack with said trunk, the connection and disconnection of said jack with said trunk being ineffective on the connection between said trunk and the operator's position at said one branch exchange.

14. In a telephone system, a pair of operators' positions, a trunk circuit connecting said positions, a pair of relays included in the talking conductors of said trunk circuit and held operated by a loop at one of said operators' positions, means responsive to the release of one of said relays to initiate the release of the trunk circuit, means responsive to the release of the other one of said relays to transmit a signal to the other of said operators' positions, and means at said one operator's position to directively release either one of said relays.

15. In a telephone system, a pair of operators' positions, a trunk circuit connecting said positions, a pair of relays included in the talking conductors of said trunk circuit and held operated by a loop at one of said operators' positions, means responsive to the release of one of said relays to initiate the release of the trunk circuit, means responsive to the release of the other one of said relays to transmit a signal to the other of said operators' positions, and means at said one operator's position to directively release either one of said relays and to prevent the release of the other of said relays.

16. In a telephone system, a pair of operators' positions, a trunk circuit connecting said positions, a pair of relays included in the talking conductors of said trunk circuit and held operated by a loop at one of said operators' positions, means responsive to the release of one of said relays to initiate the release of the trunk circuit, means responsive to the release of the other one of said relays to transmit a signal to the other of said operators' positions, and means at said one operator's position to directively release either one of said relays and to prevent the release of the other of said relays while maintaining said loop circuit unopened.

In witness wheerof, I hereunto subscribe my name this 16th day of March, 1931.

JACK F. DAHL.